(12) United States Patent
Hsu

(10) Patent No.: US 6,193,881 B1
(45) Date of Patent: *Feb. 27, 2001

(54) IN-SITU CHEMICAL REACTOR FOR RECOVERY OF METALS OR PURIFICATION OF SALTS

(75) Inventor: Kenneth J. Hsu, Zurich (CH)

(73) Assignee: Tarim Associates for Scientific Mineral and Oil Exploration AG., Zurich (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/484,813

(22) Filed: Jan. 18, 2000

Related U.S. Application Data (62) Division of application No. 08/852,327, filed on May 7, 1997, now Pat. No. 6,030,048.

(51) Int. Cl.[7] ............... B01D 24/00; E21B 43/28
(52) U.S. Cl. .................. 210/170; 210/205; 210/290; 166/105; 299/5
(58) Field of Search ................ 210/747, 170, 210/198.1, 205, 263, 290; 299/4, 5; 166/260, 261, 105; 405/128, 58

(56) References Cited

U.S. PATENT DOCUMENTS

| | | |
|---|---|---|
| 3,023,807 | 3/1962 | Tek . |
| 3,118,499 | 1/1964 | Johnson et al. . |
| 3,278,233 | 10/1966 | Hurd et al. . |
| 3,309,140 | 3/1967 | Gardner et al. . |
| 3,309,141 * | 3/1967 | Fitch et al. . |
| 3,652,129 | 3/1972 | Edmonds . |
| 4,068,715 | 1/1978 | Wu . |
| 4,105,252 | 8/1978 | Moore . |
| 4,113,313 | 9/1978 | Terry . |
| 4,155,982 * | 5/1979 | Hunkin et al. . |
| 4,169,506 | 10/1979 | Berry . |
| 4,239,288 | 12/1980 | Thompson et al. . |
| 4,443,133 * | 4/1984 | Barrett . |
| 4,475,772 * | 10/1984 | Jan . |
| 4,561,696 | 12/1985 | Graves . |
| 4,634,187 | 1/1987 | Huff et al. . |
| 4,815,791 | 3/1989 | Schmidt et al. . |
| 5,645,322 | 7/1997 | Hsu et al. . |
| 5,868,202 | 2/1999 | Hsu . |
| 6,030,048 * | 2/2000 | Hsu . |

FOREIGN PATENT DOCUMENTS

| | | |
|---|---|---|
| 148653 | 1/1980 | (DE) . |
| 2076923 | 4/1997 | (RU) . |
| 1244291 | 7/1986 | (SU) . |
| 1308752 | 5/1987 | (SU) . |
| 1408056 | 7/1988 | (SU) . |

* cited by examiner

Primary Examiner—David A. Simmons
Assistant Examiner—Fred Prince
(74) Attorney, Agent, or Firm—Helfgott & Karas, P.C.

(57) ABSTRACT

An in-situ reactor with hydrologic cells is provided to facilitate recovery of metals such as gold from rocks, or purification of salts such as potassium or magnesium chloride formed by evaporation of brines, by injecting into a source aquifer a fluid, which flows through and reacts with the solids or host rock within the in-situ reactor and then flows into a sink aquifer, from it is drained or pumped out via an exhaust borehole into a plant or a facility for further chemical treatment.

7 Claims, 4 Drawing Sheets

IN-SITU CHEMICAL REACTOR FOR RECOVERY OF METALS OR PURIFICATION OF SALTS

This application is a divisional application of Ser. No. 08/852,327, filed on May 7, 1997, now U.S. Pat. No. 6,030,048.

BACKGROUND OF THE INVENTION

This invention relates to the recovery of valuable metals and mineral salts from mineral bearing host rocks and to the purification of mineral salts formed by evaporation of natural brines.

Valuable metals are found in nature in mineral-bearing host rocks. Ores must be processed physically and chemically to produce commercial products. Normally the ores are mined underground, and then refined in factories on the surface. In order to economize on the mining cost and to minimize the environmental impacts, in-situ mining methods have been devised.

In recovery by in-situ mining of valuable metals such as the Carlin (Nevada) type of organic-rich metalliferous rocks containing appreciable amounts of disseminated gold and associated metals such as mercury, arsenic, antimony etc., or metalliferous black-shale deposits, containing uranium, gold, silver, copper, lead, zinc, and nickel etc., the problem is two-fold: the host rock has to be oxidized and it has to be made permeable for leaching solution.

Processes are known for recovery of disseminated metals in organic-rich shale, such as gold in deposits of the Carlin type, where ores are mined and milled before they are subjected to oxidation at high temperature are known. These process are commonly referred to as "shale-burning". Co-pending patent application Ser. No. 08/403,364 discloses a method to oxidize organic-rich shale by currently available methods of shale burning, before injecting leaching fluid into the burnt rock.

The currently available methods of in-situ shale burning have, however, two disadvantages:

(1) Porosity and permeability for shale to be burnt originate from the collapse of a roof above an excavated cavity. The cost of such excavation renders the process uneconomical.

(2) The fracturing of rubblized and burnt rock causes the leaching fluid to flow through fractures rather than pervasively through the whole rock. Such a flow pattern does not permit the leaching of metals from the largely intact sections of host rock which are not pulverized or not very minutely fractured.

The currently available methods of in-situ leaching metals from host rock have a disadvantage:

(1) The leaching solution must flow laterally through a porous and permeable host rock, and economic values cannot be leached out from a relatively impermeable host rock by such lateral flow of leaching solution.

It is an object of the present invention to improve control of chemical reactions in leaching metals and to recover valuable constituents at greater depths than now possible.

Humid regions with high groundwater table or arid regions with low groundwater table can be dealt with, because the hydrologic cell is designed to minimize lateral losses to natural groundwaters. Vertical flow through relatively impermeable bed is induced to flow from a lower aquifer upward to an upper aquifer or other collecting devices for reacted solution.

SUMMARY OF THE INVENTION

The present invention designs hydrologic cells so that fluid can be injected into a source aquifer before it seeps into a relatively impermeable host rock for shale-burning or for leaching of metals, and then be recovered by flowing into a sink aquifer located on the side of the body of host rock opposite the side on which the source aquifer is located.

Valuable salts have been produced by evaporation of brines in nature. However, the salts may contain considerable impurities which need to be processed physically and chemically to produce useful commercial products. The present invention designs in-situ reactors with hydrologic cell so that salts precipitated from brines can be purified economically.

Recovery of Economic Values from Host Rock with in-situ Chemical Process Underground Currently, available underground in-situ methods, used to extract copper and uranium most successfully, encounter problems in controlling water-flow through the metal-bearing host rock. Fluids find paths of least resistance, along fractures and around fragments, which diminish the efficiency of metal extraction to about 10% recovery. Controlling the rate and amount of fluids along natural aquifers so that it flows into target areas of rocks is difficult. Rock bodies such as the Carlin type of deposits, attractive as economic targets, have undesirable physical or chemical properties, which must be modified to be processed by in-situ methods.

It is not desired to force the fluids directly into the target volume of rock, but rather to introduce them into a porous and permeable aquifer, from which they seep through and reacts with the relatively impermeable host-rock, and then flow into another porous and permeable aquifer, from which the fluid can be drained or pumped out via an exhaust borehole and moved into a factory or a facility for further processing.

Where natural aquifers cannot be used, an artificial aquifer may be constructed below and above the host rock containing mineralized zones by first using the currently available methods of hydraulic fracturing to produce fracture surfaces, and then injecting particulate matter to make an artificial bed porous and permeable to fluid flow. The pressure in the lower aquifer is raised when fluid is injected under pressure from the surface to the source aquifer, and the pressure of the upper aquifer is hydrostatic or lower when fluid is being pumped out of the sink aquifer. A hydraulic potential gradient is thus established between the source and sink aquifers. The linear rate of fluid flow through relatively impermeable mineralized zones of host rock can be adjusted by varying the pressures in the two aquifers. The volume rate of fluid flow through relatively impermeable mineralized zones of host rock can be adjusted by varying the cross-sectional area of the host rock perpendicular to the direction of the fluid flow. An adequate volume of fluid can thus be induced to seep pervasively through a relatively impermeable rock.

The rate and the temperature of the chemical reaction between the injected fluid and the host rock are adjusted by injecting fluid of a given composition needed for processing rock bodies or for leaching out metals. For oxidation processes involving carbon and/or organic matter in host rock, the temperature of shale burning can be adjusted by injecting a fluid with a suitable oxygen content. For other chemical processes, involving neutralizing of pore fluids or leaching of host rock, fluid of suitable composition is injected.

Reacted fluids flowing into the upper aquifer are transferred to the surface for further processing. The thermal energy of the hot fluids may be used to produce steam to drive turbines and produce electricity. Fluids containing toxic substances can be guided to plants for detoxification. Fluids containing dissolved metals can be transferred to factories for conventional extraction of valuable components.

With the installation of source and sink aquifers, a large volume of fluid can flow through and penetrate target rock under conditions that can be controlled at the surface. Because of the large cross-sectional area of fluid flow through a layered host rock, huge volumes of fluid can be passed through rocks at rates designed to optimize the efficiency of the chemical reaction, such as shale burning, oxidation, leaching, etc.

Design of in-situ reactors takes into account geometric and geochemical characteristics of individual mineral rock bodies.

Purification of Salts Produced by Evaporation of Brines by in-situ Chemical Reactions Near Surface In producing salts by solar evaporation, the processes are, in numerous instances, not controlled to produce products of desirable purity. Magnesium salt bischoffite $MgCL_2.6H_2O$ precipitated from brines in arid regions, for example, may not be suitable for hydrolysis to produce metallic magnesium because of the presence of small amounts of sulfate, boron, and/or other compounds as impurities. Potash salt KCl precipitated from brines in arid regions may not be marketable as fertilizer because of the presence of NaCl (up to 20%) as impurities.

For the purpose of purification of salts, an in-situ reactor with one source aquifer only is designed:

(1) A salt to be purified can be dissolved entirely as a solution to be pumped into a bed of loose particulate matter which serves as the source aquifer of the in-situ reactor. The minor amount of impurities in the solution will react with a purifying chemical solid distributed in the loose particulate matter of the aquifer. The purified solution seeps vertically upward into an overlying aquifer (or downward into an underlying chamber), from which it is removed by pumping or by gravity drainage to a factory for drying.

(2) A salt to be purified can be spread out in a trough as a layer of crystalline, solid grains above or below an inert bed of particulate matter, which serves as the source aquifer of the in-situ reactor. Water or other purifying fluid is pumped into the source aquifer from which the fluid seeps vertically upward into the overlying aquifer (or downward into the underlying aquifer), where the water or purifying fluid dissolves the soluble impurities disseminated in the layer of crystalline solid. The solution containing the impurities can then be removed by pumping or gravity drainage from the aquifer, leaving the layer of crystalline solid grains free of the impurities.

Figure 1:
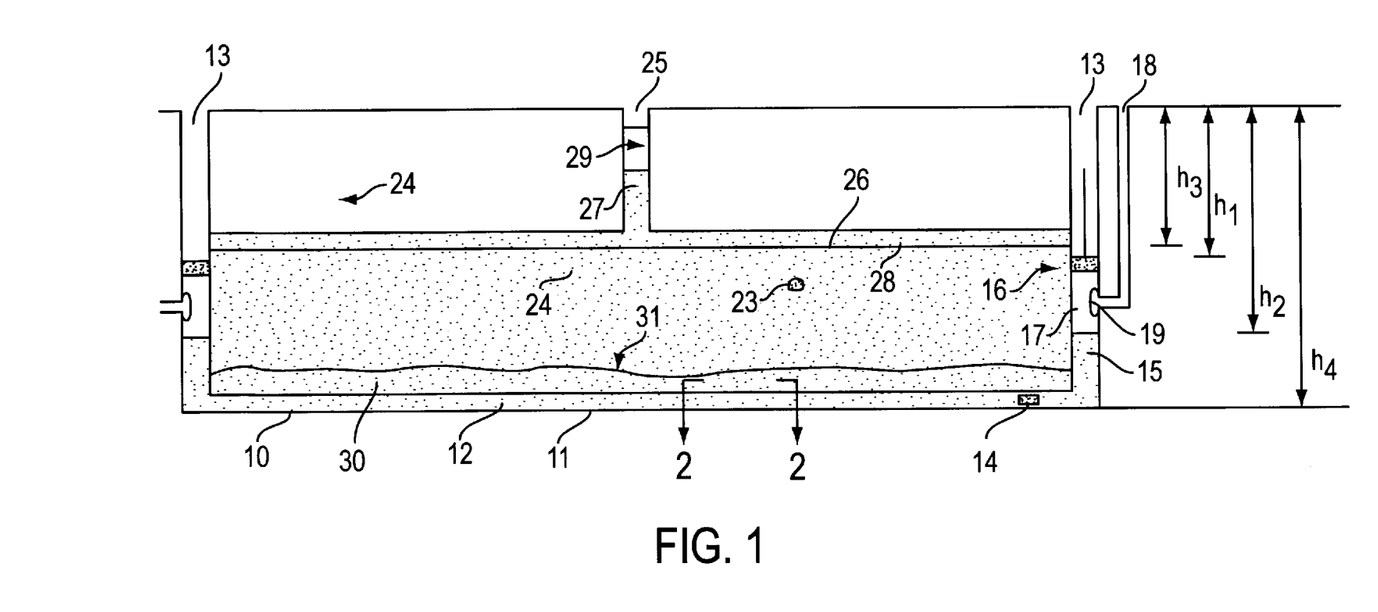
FIG. 1 is a cross-sectional view of an in-situ reactor for the processing and leaching of relatively impermeable host rock.

Referring to FIG. 1 of the drawings, the figures show a cross-section of the strata in an in-situ reactor 10 wherein $h_1$=the maximum height of the steel piston in the well in the in-situ reactor;

$h_2$=the height of the sand in the injecting well;

$h_3$=the depth of the upper hydrofracture zone of the reactor; and $h_4$=the depth of the injecting well drilled to the base of the artificial aquifer.

DESCRIPTION OF THE PREFERRED EMBODIMENTS (1) Recovery of gold and of energy resources from host rock with in-situ processes underground.

One embodiment of the present invention is shown in FIG. 1. Loose material such as quartz sand, is injected under pressure into in-situ reactor 10 having a subsurface horizontal fracture 11 produced previously by hydrofracturing and an artificial aquifer 12 above the subsurface horizontal fracture 11. As seen from FIG. 1, reactor 10 has a bottom, a top and the side walls. The injected loose material, forming a layer (t-centimeter thick), serves as the source aquifer at the base of a relatively impermeable host rock to receive fluids continuously injected for the oxidation of the host rock, and/or for the leaching of metals from the host rock under controlled conditions. To aid in-situ oxidation at high temperature, the injected loose material may be a mixture of sand grains, coal, and liquid fuel.

Injecting wells 13 are drilled to the depth, $h_4$ meter, to the base of the artificial aquifer 12. A mechanism 14 to trigger combustion is installed. The injection wells are filled up with clean sand 15 up to $h_2$ meter. The permeable sand, which should be loosely cemented in the wells, serves as (a) a conduit for an injected fluid, such as compressed air or leaching solution, to be pumped into the aquifer, and (b) as a temperature-insulator so that the ongoing shale-burning process will not burn out of control. The walls of the wells above $h_2$ meters are cemented. A steel-piston 16 is installed in the well and can move vertically between $h_2$ and $h_3$ meters. The cemented segment of the well between $h_2$ and $h_3$ meters thus forms a compression chamber 17. The downward movement of the piston compresses the air or other injected fluid in the compression chamber. The compressed air or fluid can flow under pressure through the sand-filled portion of the well 15 into the artificial aquifer 12. When the pressure of the chamber is relieved during the upward movement of the piston, air or fluid to be injected from outside enters a fluid supply borehole 18 and through a one-way valve 19 into the chamber, to be compressed and supplied to the aquifer 12. If downhole-compression does not provide enough volume flow, compressed fluid could be supplied from the surface through, borehole 18 and valve 19.

Figure 2:
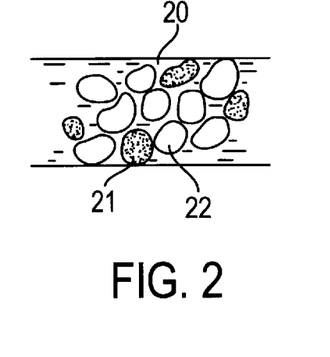
FIG. 2 is an enlarged cross-sectional view of an in-situ reactor along lines 2—2 of FIG. 1.

At the start of the "shale-burning" process, the trigger mechanism 14 in FIG. 2 causes the combustion of the fuel 20 in the aquifer 12, causing the coal 21 which has been mixed with the sand 22 in the aquifer to burn. Continuous burning is possible only when compressed air, oxygen or other fuel is supplied from the compression chamber 17. The supply of injected fluid is adjusted so that the burning of coal 21 in the aquifer 12 can proceed at a rate to produce an optimum temperature to cause the oxidation of the carbon and/or organic matter 23 in the host rock 24 immediately above the aquifer.

Oxidation is possible where the temperature is high enough for the carbon and/or organic matter disseminated in the host rock to react with oxygen from compressed air or another injected fluid, and thus oxidize. Exhaust wells 25 are also drilled into the host rock 24, which functions as an in-situ reactor while it is being oxidized. The exhaust well can be drilled to a depth of an upper hydrofracture zone 26, $h_3$ meters beneath the surface. Those wells can also be filled with loosely cemented sands 27. For a better control of the flow rate, an upper aquifer should be formed through the injection of loose materials such as quartz sand 28 into the upper fracture zone 26. Exhaust fluid from the oxidized host rock 24 seeps into the upper fracture or the upper aquifer. The exhaust fluid enters the exhaust wells 25 and is diluted in the water-filled portion 29 of the exhaust wells, where it can be pumped out for further processing if it contains valuable material, or for waste disposal. Hot fluids or steam recovered as exhaust fluid may be used to power electric generators.

The host rock 30 immediately above lower injection aquifer 12 is the first to be burnt. The burning front 31 moves more or less uniformly upward through the host rock 24, with a layer of the rock 24 being actively burnt or oxidized under a prescribed high temperature. As the burning front 31 moves upwardly through the whole rock toward the upper aquifer 28, which is formed in the same manner as lower aquifer 12, the host rock behind the burning front is oxidized. The burning can be stopped by cutting off the oxygen supply, after the total volume of the host rock between the lower and upper aquifer is oxidized, i.e., when the burning front moves up to the upper aquifer level.

The rate of the movement of the burning front can be adjusted through the adjustment of the pressure of compression; the greater the pressure of the compressed air, the greater the supply of oxygen, the faster the oxidation, the higher the temperature and the higher the pressure in the zone of combustion in the host rock 24. Consequently, the upward movement of the front is also faster. The "exhaust" gases consist of water and carbon dioxide and other substances. Experiments can be conducted during production testing to determine the optimum rate of oxygen supply for a thorough oxidation of the host rock within the in-situ reactor.

The oxidation of carbon and/or organic matter under elevated temperature, or "shale-burning", can be suppressed at any time, when no oxygen is supplied to the underground reactor although the oxidation of some sulfides may continue through the utilization of mineral oxygen in the host rock. The rate, the degree, and the extent of shale burning can thus be easily controlled.

After shale burning is completed, the hydrologic system utilized to promote burning can be utilized for the leaching of metals from the oxidized rocks. After the burning, the lower aquifer 12 consists only of inert grains such as quartz sand, and the upper aquifer 28 consists of inert grains such as quartz sand, but is filled with interstitial water with dissolved carbon dioxide. Depending upon the desired pH for leaching the metals in any particular case, the interstitial fluid in the aquifers and in the oxidized host rock may have to be flushed by water or neutralized. Acids produced can be neutralized by a solution with an acid neutralizing content (ANC), such as a solution of calcium and/magnesium bicarbonate. The neutralizing solution can be pumped into the injection wells 13 through the lower aquifer 12. The solution seeps into the oxidized host rock 14, and then is expelled by the fluid movement through upper aquifer 28 to the exhaust well 25.

After the interstitial fluid in the aquifers and in the oxidized host rocks has been neutralized, leaching solution is pumped into the injection wells 13, and it moves through the lower aquifer 12 and flows vertically upward into the oxidized host rock 24. The leaching solution enriched in the metals to be recovered then moves through upper aquifer 28 into the exhaust well 25 or into a harvest pond.

The linear rate of the upward movement or seepage of the leaching solution should be very slow through the relatively impermeable host rock since the slow linear rate of movement provides a high efficiency of leaching. The total volume of the leaching fluid seeping through the host rock is nevertheless very considerable, because the cross section perpendicular to the upward hydrodynamic movement, i.e., the area extent of the host rock to be mined, is very large. The rate of the movement can be adjusted through the regulation of the pressure in lower aquifer 12, which is determined by the pressure of the injected fluid, and the pressure in the upper aquifer 28 which can be hydrostatic or reduced by pumping.

The typical Carlin type ore contains about 0.5% carbon which is too low to support burning. While, in principle it is possible to mildly oxidize ores low in hydrocarbons and sulfides chemically, taking advantage of the in-situ reactor's control of flow and chemical compositions to pervasively react with mineral surfaces, the process will be most applicable to deposits that are rich in hydrocarbons, i.e., having at least 3% carbon. Burning at high temperatures converts ores high in organic matter and sulfide minerals into ores suitable for leaching. For oxidation without shale burning, the same type of in-situ reactor with hydrologic cell is used.

Loose materials under pressure are injected into a subsurface horizontal fracture 11 to form an artificial aquifer 12. The injected loose material may consist of inert sand grains such as quartz sand, ceramic beads, or other inert, non-combustive material capable of providing a porous bed.

Oxidation occurs when an oxidizing liquid is injected into the aquifer 12 and flows upward into the host rock 14. The flow of the oxidizing solution must be sufficient to penetrate through the entire host-rock body, and the rate of flow must be regulated so that it is be slow enough for a thorough oxidation of pyrite and of organic matter.

Possible oxidizing agents can be a) oxygen gas, hydrogen-peroxide, sodium hypochlorite, nitric acid where water is the solvent, or b) ferric-iron compounds and other chemical oxidants. In some cases, this process can be enhanced by the addition of micro-organisms that can oxidize sulfide and iron.

Acids produced by the oxidation of pyrite can be neutralized by circulating a solution with an acid neutralizing content (ANC) having 2 to 4 times the weight percent of calcite and/or dolomite needed relative to one weight percent pyrite. Neutralization of acids with a solution containing ANC is necessary since leaching of metals, such as the cyanide leaching for gold is not effective in an acidic environment, and to reduce the sulfuric acid freed by pyrite-oxidation.

A problem of the pyrite-oxidation process to release gold is to control the release of arsenic, or other hazardous substances. Environmental considerations for containment and immobilization of hazardous substances must be addressed. Since. the host rocks commonly contain calcium, this element may also combine with arsenic to form arsenic compounds, and thus neutralize the arsenic.

Contaminants are dissolved in the exhaust fluid. The contaminant bearing exhaust fluid can then be drained into a treatment pond. Reactions converting the contaminants to other forms can then be carried out. Iron may then be added as an oxidant, and act as a chemical trap for arsenic since oxidized (ferric) iron will absorb and react with oxidized arsenic compounds (usually $H_2AsO_4$) to form precipitates.

Where carbon or organic matter in the host rock is not completely oxidized during shale burning, or during the oxidation of pyrite without shale burning, additional leaching by sodium hypochlorite is necessary.

After the oxidation without shale burning, and after the neutralization of the interstitial fluids in aquifers and in host rock, leaching solution can be injected into the injection aquifer to leach the metals in host rock, in the same manner as described above for the case of leaching after shale burning.

Also solubilized by oxidizing of gangue metallic sulfides which are chiefly pyrite in Carlin type deposits, are other metals, including arsenic, antimony, mercury, and thallium. Aqueous metallurgical methods can recover those that are worthwhile or convert them to non-hazardous solids, on the surface in holding ponds.

To summarize, it is possible to effect in an in-situ reactor having hydrologic cells, oxidation by burning or chemical means. The systems may be flushed of reaction products, solution parameters such as pH adjusted, and specially designed leaching solutions passed through to extract desired elements, using the hydraulic gradients of the in-situ reactor. To recover metals from a large and irregular-shaped body, the body is divided into a number of hydrologic cells. Each hydrologic cell consists of 6 injection wells, a lower aquifer, an upper aquifer, and one exhaust well. The cell can be located at any depth, and the shape and size of the cell depend upon the geology of the ore deposit.

An ore body such as Carlin type gold deposits can be divided into 10 m thick slices, and each slice of the deposit can be exploited by honey-combed shaped hydrologic cells. A hexagonal hydrologic cell with each side 20 m long, and a zone 10 m thick has a volume of 10,400 $m^3$ can be chosen.

The first hydrologic cell requires six injecting wells, one exhaust well, one lower aquifer and one upper aquifer. For each additional cell, the number of the injecting wells required is only one per cell because each cell shares its injecting wells with adjacent cells. To mine a deeper slice of the ore-deposit, each of the wells has to be deepened another 10 m, and only an additional artificial aquifer needs to be installed as the lower aquifer to inject fluid into this second depth zone. Adding the negligible cost of fuel, such as coals for oxidation, and the modest cost of leaching fluid, an economic exploitation of low-grade gold ore of the Carlin type (5 ppm, or about 125 kg per unit cell) is feasible, in any region and at any reachable depth.

Where the Carlin type of gold is a large body, of nearly homogeneous, carbon-rich or organic-rich shale or other fine-grained rocks, a regular arrangement of hydrologic cells can be planned and the exploitation can move from one level (or depth zone) to the next deeper level. Where the gold deposits are irregular and their geology complicated, the size and shape of the hydrologic cells have to be modified to accommodate the local geologic conditions. Where the relatively impermeable host rock is interbedded with more permeable siltstone or sandstone, the location of the artificial aquifers has to be selected to ascertain that the injection of the oxidizing and leaching agent can be controlled. Natural underground aquifers may not be suitable as an aquifer for a hydrologic cell to oxidize the host rock or leach the metals from host rock, because the hydrology of the injected fluid cannot be closely controlled and monitored in a natural lateral aquifer of indefinite dimensions.

Where natural aquifers cannot be avoided, engineering devices to restrict the flow of liquid laterally along the aquifer must be installed, to direct leaching fluid to flow from a lower natural aquifer to an upper aquifer.

The in-situ reactor designed for the burning of organic matter in shales can be applied to burn other carbon or carbon compounds in sedimentary rocks, such as the carbon in coal which cannot be economically mined, the hydrocarbon in oil shale and the tar in tar sands. Using the same principle of installing two aquifers, a lower aquifer to receive the compressed air, oxygen, or compounds for the oxidation of the carbon or hydrocarbon in the rocks, and an upper aquifer to receive the hot gases of carbon dioxide and steam to be drained into an exhaust well, where the hot gases are piped into an electricity-generating plant.

(2) Purification of salts evaporated from natural brines.

In another embodiment of the present invention, a reactor or an in situ reactor is provided for purification of salts.

Bischoffite is produced cheaply from the evaporation of brines in arid regions, and it can be the raw material for electrolysis to produce metallic magnesium. The purity of the bischoffite does not always meet the requirements of magnesium producers. Frequently, the presence of significant amounts of sulfate and borate impurities renders the bischoffite unsuitable for electrolysis-production of metallic magnesium.

Waste brine from the production of potash salts in arid regions is commonly a nearly pure magnesium chloride solution. However, the brine may contain a very minor amount of sulfate and an even smaller amount of borate. Bischoffite will precipitate upon solar evaporation or crystallize under subzero temperature. Commonly, a small amount of residual sulfate ions will co-precipitate as a sulfate salt mixed with the bischoffite, in a concentration of a few hundred parts per million. In a late stage of evaporation of magnesium-chloride brines, after much bischoffite is already precipitated, the brine is also enriched in borates, which will eventually co-precipitate as a borate salt mixed with the bischoffite. The sulfate and borate ions in a brine can be removed by chemical agents in a aquifer/filter at the base of an in-situ reactor having only a source aquifer or a factory reactor.

Figure 3:
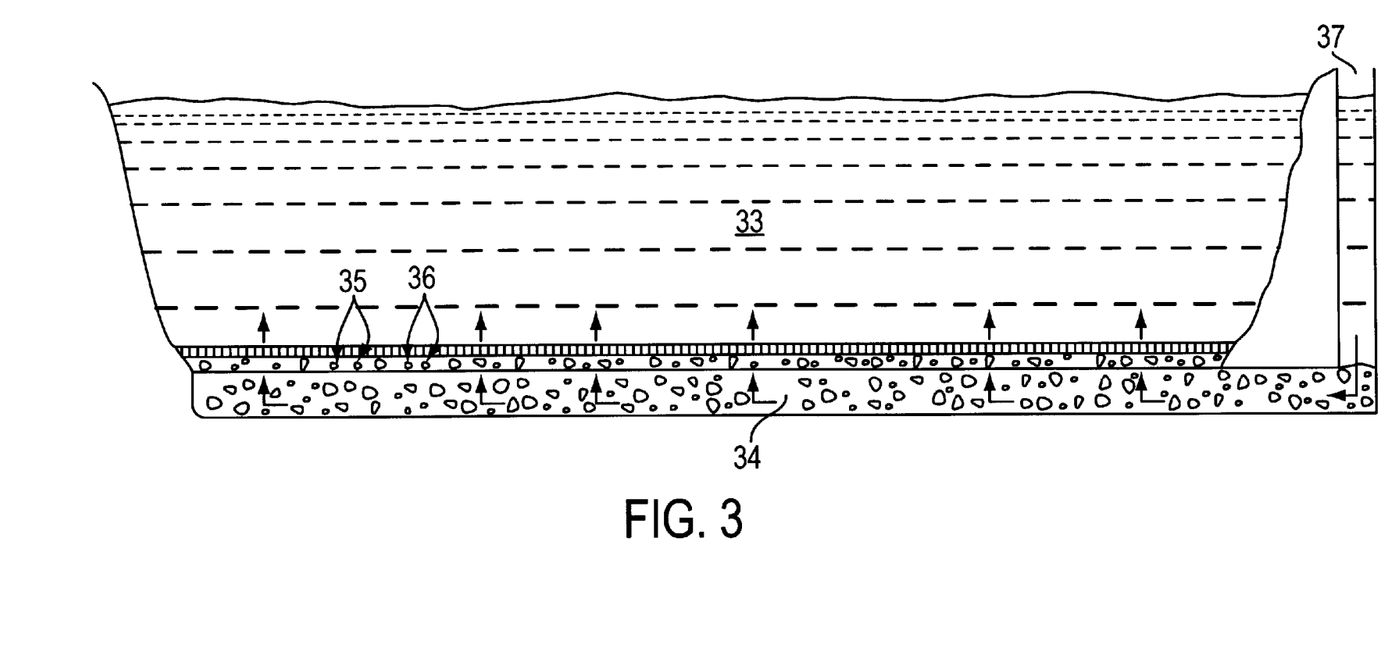
FIG. 3 is a cross-sectional view of an in-situ reactor having a source aquifer for purification of bischoffite.

As shown in FIG. 3, evaporating pond 33, with dimensions x meter long, y meters wide, and z meters deep is excavated, where bischoffite is precipitated under solar evaporation. An aquifer/filter consisting of a layer of chemically inert, granular material, a chemical reagent and an inert sieve like covering aquifer, t meters thick, is installed at its base. The aquifer 34 contains a lower layer of chemically inert substance, such as quartz sand. Above that is a layer of a mixture of fine sand 35 and a minor amount of chemical reagent (not shown) to purify the brine; the nature and the amount of the reagent depend upon the chemistry of the brine to be purified. Lying on top of that is a sieve 36, made of a chemically inert substance such as plastic which permits brine solution, but not solids to pass through.

Brine to be purified is pumped through an injection well 37 into aquifer 34, from which the brine rises through sieve 36. The minor dissolved constituents which are the impurities of the brine will react with the disseminated chemical reagents in the filter. The impurities are precipitated as solid phases (not shown) in the filter. The brine, now purified, flows under the hydrologic pressure upward into the evaporating pond where it is evaporated to precipitate a pure salt.

The chemical reagents will eventually be depleted, and/or the precipitates from the purification processes will eventually plug up the pore space to hinder the free movement of brine through the aquifer/filter. In such case, the filtering layer 34 is removed and replaced by a new layer of a mixture of sand and chemical reagent.

For the purification of magnesium brines with considerable dissolved sulfate ions and borate, calcium chloride can be the purifying agent. The sulfate ion is precipitated as calcium sulfate dihydrate (gypsum) and the borate ion is precipitated as calcium borate hydrate ($CaB_2O_4 \cdot 6H_2O$). If the sulfate ion is to be completely eliminated, barium chloride can be used as the purifying agent, whereby sulfate ion is precipitated as barium sulfate.

Figure 4:
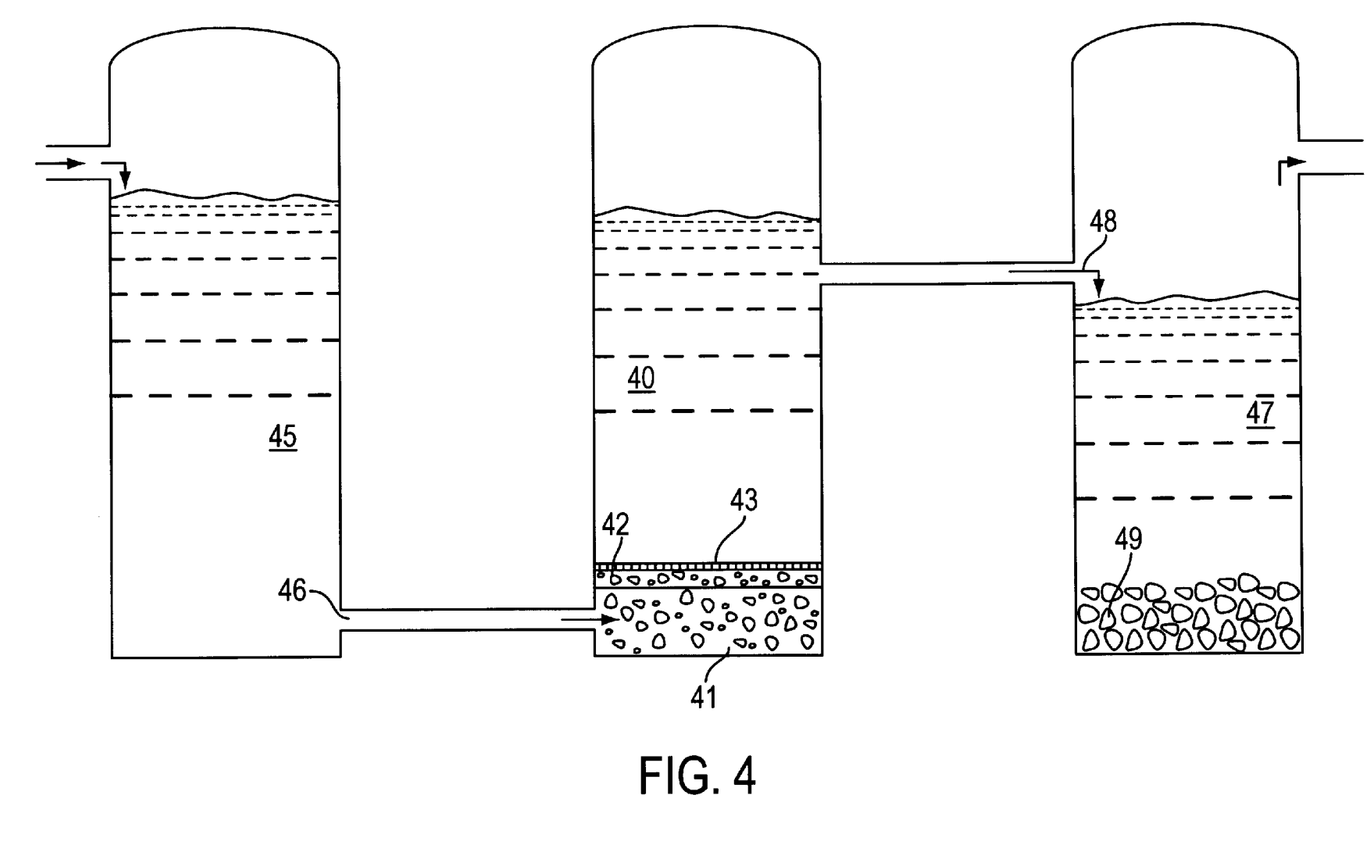
FIG. 4 is a cross-sectional view of a factory type reactor.

FIG. 4 shows yet another embodiment of the present invention using a factory reactor. The purification process can also be effected in a factory similar to an in-situ reactor. An aquifer/filter is installed at the base of an large tank 40. The aquifer material consists of chemically inert substance 41, such as quartz sand. Above that is an aquifer/filter layer 42 of a mixture of sand and a minor amount of chemical reagents to purify the brine; the nature and the amount of the reagents depend upon the chemistry of the brine to be purified. Lying on top of the aquifer/filter is sieve 43, consisting also of a chemically inert substance such as plastic; the sieve will permit a brine solution, but not solids to pass through. Brine to be purified is pumped into the aquifer/filter 40. The minor dissolved constituents which are the impurities in the brine react with the chemical reagents in the aquifer/filter 42. The impurities in the brine are precipitated as solids in the aquifer/filter. The chemical reagents will eventually be depleted, and/or the precipitates from the purification processes will eventually plug up the pore space to hinder the free movement of brine through the aquifer/filter. In such case, the filtering layer 42 is removed and replaced by a new layer of a mixture of sand and chemical reagents. The brine to be purified is fed from surge tank 45 through feed line 46 to aquifer filter 40. The purified brine from aquifer/filter 40 is fed through feed line 48 to collection tank 47 where pure MgGl2 49 crystallizes and is collected and dried.

For purification of bischoffite precipitated from brines in arid regions, calcium chloride can be the purifying agent. The sulfate ion is precipitated as calcium sulfate dihydrate (gypsum $CaSO_4 \cdot 2H_2O$) and the borate ion is precipitated as calcium borate hydrate ($CaB_2O_4 \cdot 6H_2O$). If the sulfate ion is to be completely eliminated, barium chloride can be used as the purifying agent, whereby sulfate ion is precipitated as barium sulfate.

For processing potash salt (sylvite KCl), after factory processing from the evaporation of brines in arid regions, an in-situ chemical reactor having only a source aquifer (FIG. 5) can be employed. In numerous instances, a significant amount 5–20% of NaCl, which has been co-precipitated with a potash salt, cannot be separated from KCl. Such impure potash salt cannot be marketed as fertilizer for agriculture production, because the adverse effect of NaCl to salinize the soil. Many tons of such impure potash salt are stored, and they can only be sold after the NaCl impurity is removed.

Figure 5:
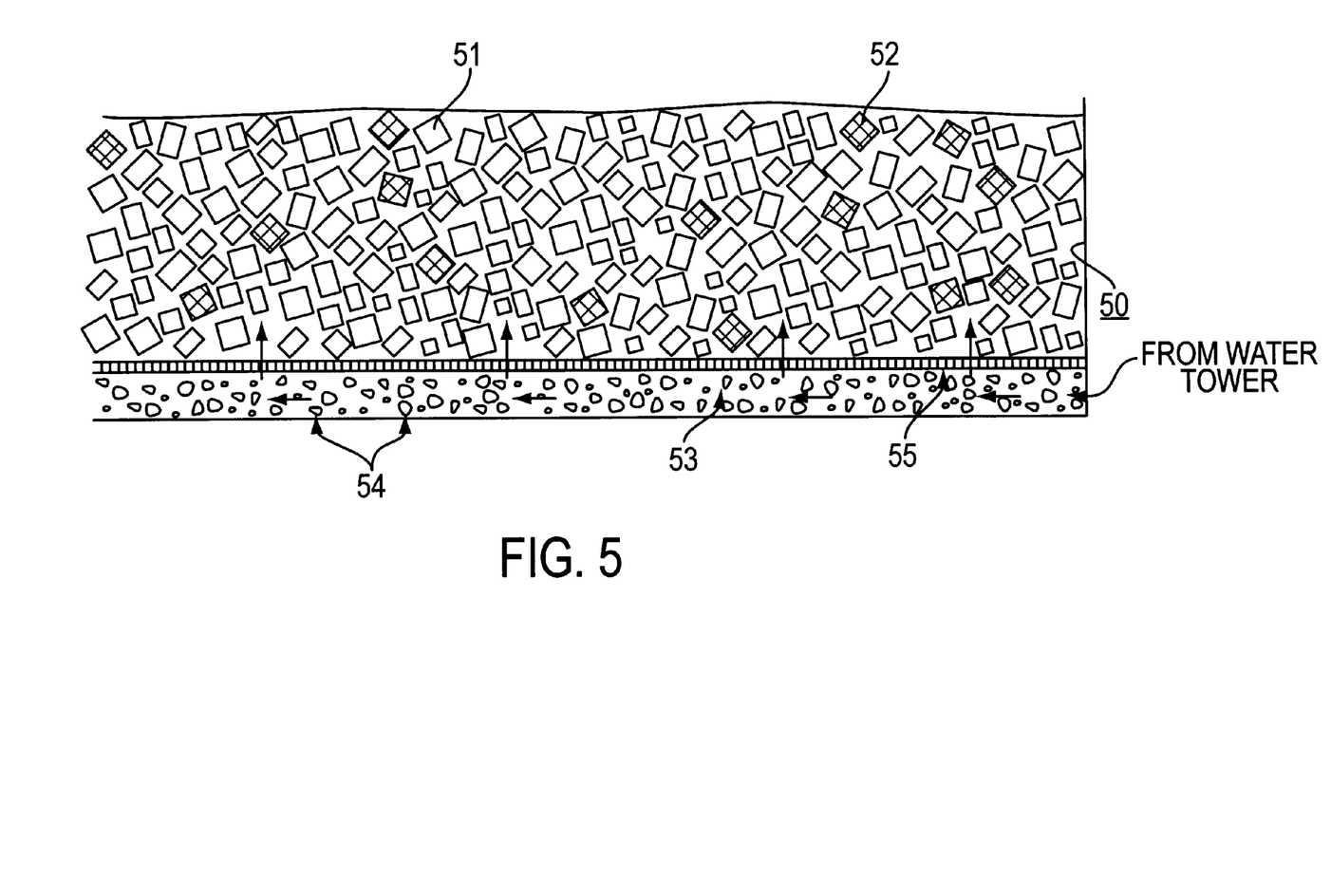
FIG. 5 is a cross-sectional view of an in-situ chemical reactor suitable for use in purifying salts recovered from brines.

The reactor is formed of a trough 50, with dimensions x meter long, y meters wide, and z meters deep. A bed of sylvite 51, with halite impurities 52 is spread out to almost fill the trough. An artificial aquifer 53, t meters thick, is installed at the base of the trough. The aquifer material consists of a lower layer of chemically inert substance 54, such as quartz sand. Lying on top of that is a sieve 55, consisting also of chemically inert substance such as plastic which will permit water but not solids to pass through.

Sylvite KCl and halite NaCl have very different temperature coefficients of solubility. KCl is not very soluble in low temperature but is very soluble in high temperature. NaCl has a higher solubility in low temperature than in high temperature. Laboratory experiments have indicated that the NaCl impurity in a sylvite-halite salt mixture can be effectively removed by passing cold water through the mixture, when an equal or less amount of KCl is also dissolved in the solution. The solution, saturated with NaCl and KCl, is heated and evaporated. More NaCl than KCl will be precipitated because of the solubility of NaCl decreases at higher temperatures. The residual solution, being thus enriched in KCl, could be cooled down again to permit the precipitation of KCl, thus recovering part of the KCl removed during the primary leaching of NaCl from the impure sylvite-halite mixture.

In applying this principle to purification in a reactor having only one source aquifer, cold water is pumped in from a water tower (not shown), preferably during the early morning hours when the air temperature is low, into the source aquifer of a first reactor. The water ascends upward into the pore space of the impure sylvite KCl in the trough, to leach out NaCl, while some KCl is at the same time also lost to the leaching solution. The leaching solution, now a saturated solution of NaCl and KCl at a relatively low temperature, is removed by pumping or by gravity drainage into a second reactor, of the same design as the first reactor (FIG. 5).

The solution pumped from the first reactor to the second reactor is a saturated solution of KCl and NaCl. Halite, with some mixture of sylvite, is precipitated in the second reactor, when the saturated brine is partially evaporated under the sun. The proportion of the two is a function of the evaporation temperature. To increase the proportion of halite/sylvite precipitate in this reactor, the evaporation temperature can be raised using a heating device which can be installed below the aquifer. The device can consist of plastic pipes, in which hot brines from solar ponds or hot air produced by fuel, circulates.

The residual brine from the second reactor, having been heated to an elevated temperature, is enriched in KCl and is drained into a third reactor. KCl is precipitated from the solution in the third reactor as the temperature declines (during the night, for example). Little or no NaCl is precipitated during the cooling process because its solubility increases with decreasing temperature.

In those instances when considerable KCl is co-precipitated with NaCl in the second reactor, hot water can be injected into the aquifer at the base of the reactor where the water then ascends to dissolve KCl. The hot solution, enriched in KCl, is drained to the third reactor, where it is cooled to induce KCl precipitation.

The process of circulating purifying water through the three reactors can be repeated until the KCl in the first and third in-situ reactors has a purity meeting commercial standard.

The process could also be effected in factory chemical reactors according to the same principle.

Although the present invention has been described with reference to various embodiments, it is to be understood that modifications and variations may be resorted to without departing from the scope of the invention, reference being had to the appended claims for a full definition of the scope of the invention.

What is claimed is:

1. A reactor for recovering purified metals and salts from mineral bearing materials including brines or ores containing impure metals or salts, the reactor having at least a top, a bottom and side walls and comprising fluid distribution means located at the bottom of said reactor to induce hydrodynamic flow of a reaction fluid capable of reacting with components in said mineral bearing materials; conduit means for supplying reaction fluid to said fluid distribution means; reactor means located adjacent said fluid distribution means for inducing a chemical reaction between said mineral bearing materials and said reaction fluid; collection means adjacent said reactor means for recovering reaction fluid exiting said reactor means; means for moving reaction fluid through said reactor means; and means for recovering said reaction fluid from said collection means.

2. The reactor according to claim 1, wherein the distribution means is a source aquifer containing a loose material.

3. The reactor according to claim 2, wherein the loose material in said aquifer is a mixture of sand and ceramic particles and a compound capable of reacting with the impure salt or metal to remove impurities.

4. The reactor according to claim 2 wherein said source aquifer is a horizontal fracture produced by hydrofracturing relatively impermeable host rock.

5. The reactor according to claim 1 wherein said reactor means is a rock bed which has been treated by shale burning to provide a fractured rock structure.

6. The reactor according to claim 1 wherein said collection means is an artificial aquifer located above said reactor means.

7. The reactor according to claim 1 wherein said fluid distribution means is comprised of a bed of chemically inert, granular material, said reactor means is a bed of a mixture of inert granular material and chemical components capable of reacting with said mineral bearing materials and said collection means is a chemically inert material.

* * * * *